(12) United States Patent
Dowling

(10) Patent No.: US 7,242,909 B2
(45) Date of Patent: Jul. 10, 2007

(54) LOCATION AIDED WIRELESS MEASUREMENTS

(75) Inventor: Martin J. Dowling, Plymouth Meeting, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 558 days.

(21) Appl. No.: 10/737,644

(22) Filed: Dec. 16, 2003

(65) Prior Publication Data

US 2005/0130598 A1 Jun. 16, 2005

(51) Int. Cl.
*H04B 17/00* (2006.01)

(52) U.S. Cl. .................... 455/67.11; 455/423

(58) Field of Classification Search .. 455/67.11–67.15, 455/423–425
See application file for complete search history.

(56) References Cited

U.S. PATENT DOCUMENTS 6,466,797 B1 * 10/2002 Frodigh et al. .......... 455/456.1
2005/0026626 A1 * 2/2005 Carl et al. ............... 455/456.1

* cited by examiner

*Primary Examiner*—Lee Nguyen
(74) *Attorney, Agent, or Firm*—Volpe and Koenig, PC

(57) ABSTRACT

A location of a wireless transmit/receive unit (WTRU) is determined. A measurement is made by the WTRU. The measurement is sent to a base station. The sent measurement is combined with measurements sent by other WTRUs to estimate a measurement made for a longer duration than the sent measurement.

22 Claims, 2 Drawing Sheets

LOCATION AIDED WIRELESS MEASUREMENTS

FIELD OF INVENTION

The invention generally relates to wireless communication systems. In particular, the invention relates to estimating parameters in such systems.

BACKGROUND

In wireless communication systems, parameter measurement is essential to the efficient operation of the system. These parameters include, bit error rates (BERs), block error rates (BLERs), signal to interference ratio (SIR) measurements, Doppler shifts, etc. To illustrate, in many wireless communication systems, the block error rate is used to determine whether transmission power levels need to be increased or decreased. A high BLER results in an increase in power and a low BLER results in a decrease in power. The use of the BLER measurements helps the wireless system maintain an efficient trade-off between transmission power levels and system capacity.

In certain situations, these parameters are difficult to measure. To illustrate, the BLER for a voice service is desired to be measured at a 95% confidence level. A number of Cyclic Redundancy Check (CRC) errors is used as the BLER measure. If the quality target is $10^{-2}$, it takes approximately 700 measurements to estimate the error within ±0.01 with 95% confidence. Accordingly, 700 (CRC) blocks need to be evaluated. For typical voice communication, two CRC's may occur every 40 ms. As a result, it takes fourteen seconds to reach a 95% confidence level for the BLER. For a fast moving mobile, channel conditions can change considerably in fourteen seconds. A mobile moving at 100 kilometers per hour will travel approximately 0.4 km in that time period. Accordingly, the channel conditions at two locations 0.4 km apart may be totally different. Additionally, a quick fade, such as a one second fade, could occur during that period, making the calculated BLER erroneous.

Accordingly, it is desirable to have alternate approaches to measuring such parameters.

SUMMARY

A location of a wireless transmit/receive unit (WTRU) is determined. A measurement is made by the WTRU. The measurement is sent to a base station. The sent measurement is combined with measurements sent by other WTRUs to estimate a measurement made for a longer duration than the sent measurement.

BRIEF DESCRIPTION OF THE DRAWING(S)

DETAILED DESCRIPTION OF THE PREFERRED EMBODIMENT(S)

Hereafter, a WTRU 20 includes but is not limited to a user equipment, mobile station, fixed or mobile subscriber unit, pager, or any other type of device capable of operating in a wireless environment. When referred to hereafter, a base station 22 includes but is not limited to a base station, Node-B, site controller, access point or other interfacing device in a wireless environment.

Figure 1:
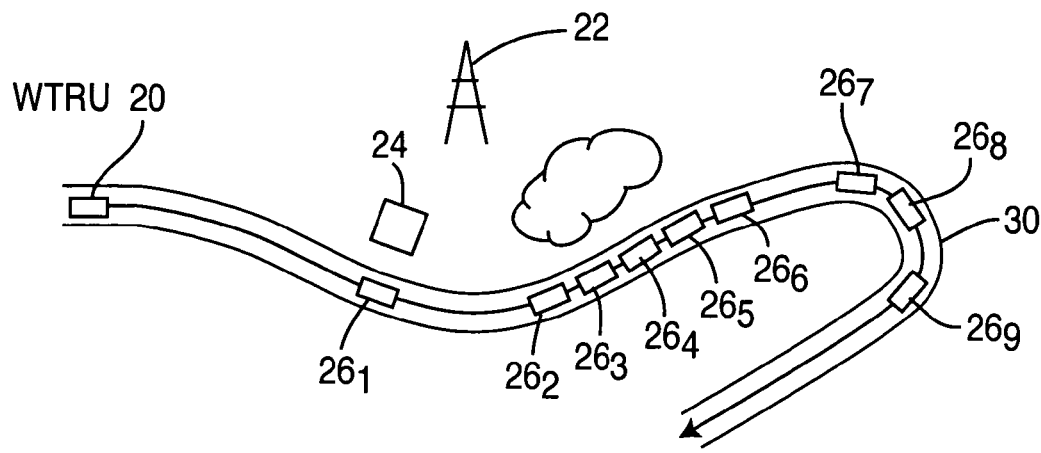
FIG. 1 is an illustration of an application for location aided wireless measurements.

FIG. 1 is an illustration of applying location aided channel condition measurements. As illustrated in FIG. 1, a WTRU 20 is traveling along a highway in a cell serviced by a base station 22. As the WTRU 20 travels along the highway as illustrated by the arrow, at position $26_1$, a small obstruction 24, such as a small building, causes a deep fade. The deep fade would likely result in a short duration high BER, high BLER and low SIR. As the WTRU 20 continues along the highway, it encounters a dense wooded area 28, at positions $26_2$ to $26_6$. Due to the varying nature of the wooded area 28, each position $26_2$ to $26_6$ may encounter differing channel conditions. As the WTRU 20 continues along the highway towards position $26_7$, the WTRU 20 begins to experience a Doppler shift (the carrier frequency decreases) as it moves at a fast rate away from the base station 22. As the WTRU 20 passes through position $26_8$ along the curve 30, the Doppler shift continues. At position $26_9$, the WTRU 20 ceases to be moving directly away from the base station 22 and the Doppler shift disappears and the carrier frequency returns to normal As illustrated in FIG. 1, the WTRU 20 experiences many short term changes in channel conditions.

Figure 2:
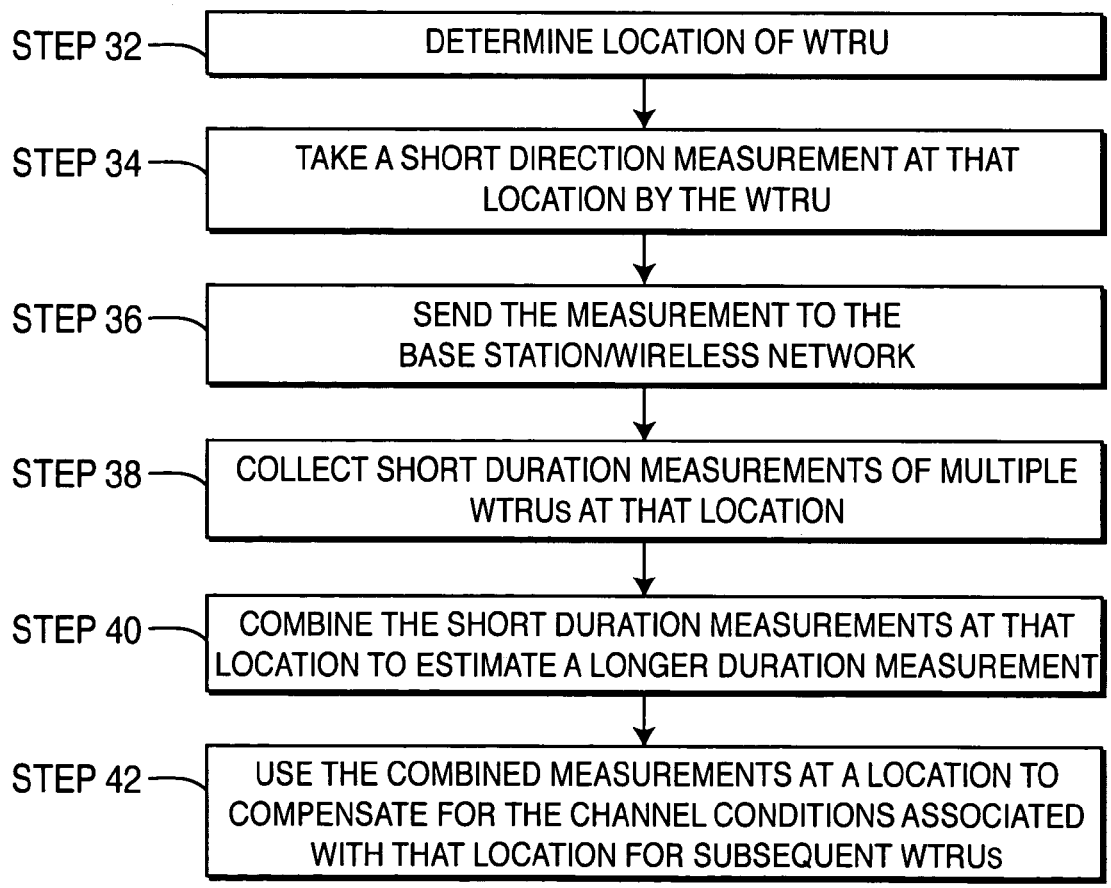
FIG. 2 is a flow chart for location aided wireless measurements.

FIG. 2 is a flow diagram of location aided measurements. A location of a WTRU 20 is determined, step 32. At that location, a short duration measurement is taken, step 34. The measurement is sent to the base station 22/wireless network 44, step 36. The length of time that the short duration measurement is taken may be predetermined, such as 1 ms, or the measurement length may be sent along with the measurement to the base station 22/wireless network 44. These measurements and the location of the measurements are stored, step 38. If the duration of the measurements is also sent, the duration is also stored.

After collecting the measurements for multiple WTRUs 20, the measurements are combined, as an estimated longer duration measurement, step 40. To illustrate, the BLER for voice service is desired to be measured at a 95% confidence level. As previously described, if the quality target is $10^{-2}$, it takes approximately 700 measurements to estimate the error within ±0.01 with 95% confidence. This requires the BLER to be measured for fourteen seconds. To achieve the same certainty, multiple shorter duration measurements can be combined to achieve the same certainty level, such as 350 BLER measurements from 350 passing WTRUs 20 location derived using 2 CRCs each. The benefit is that an average of multiple short duration measurements at a particular location will be more accurate than a long duration measurement made over varying conditions.

One approach for combining these measurements uses ergodicity. For ergodic random processes, the time-averaged mean values, as well as some other properties, are equal to the corresponding ensemble averaged values. Typically, ergodicity is employed to justify substituting time-averaging of one sample function for instantaneous ensemble averaging of multiple sample functions that describe a random process. However, in this embodiment, it is advantageous to use ergodicity to substitute multiple sample functions (such as short duration BLERs from multiple WTRUs passing the same location) for time averaging of one sample function (BLER measurement of one WTRU over time). Even if the measurement duration is sufficient to achieve a desired confidence level, the combining of measurements over multiple WTRUs 20 provides for even higher accuracy in the values.

For certain measurements, other factors may affect the measurement. To illustrate, an interference measurement, such as interference signal code power (ISCP), made during peak hours may have little correlation to off-peak hours, such as at night. Accordingly, a time of the day of the measurements may be stored so that only measurements reflecting similar channel conditions are combined. Another factor may be the weather. Measurements taken during a thunderstorm may vary significantly from measurements taken during a sunny day. As a result, a factor representing the weather conditions may be stored along with the measurements. Other factors include time of day, day of the week, season of the year, environmental conditions, light/darkness conditions, interference conditions, cell loading, speed of the WTRU and the type of WTRU taking the measurement. By categorizing these measurements, the accuracy of the ensemble process can be improved by only compiling measurements made under similar conditions (i.e., in the same category).

Using the combined measurements at each location, factors can be derived for compensating for the channel conditions for subsequent WTRUs 20, step 42. In some instances, a message is sent to the WTRU 20 having compensating information. To illustrate by referring to FIG. 1, at position $26_1$, the combined measured BLER may be quite high. To compensate, the base station may increase the downlink transmission power level, such as by increasing a target SIR used in the power control algorithms for a short duration. For the uplink an increase to the target SIR is sent to the WTRU 20 to compensate for the anticipated deep fade in its power control algorithm. Similarly at positions $26_2$ to $26_6$, adjustments may be made to the target SIRs used in the power control algorithms to compensate for the anticipated fades at those positions. At positions $26_7$ to $26_9$, Doppler adjustments are sent to the WTRU 20 to compensate for the anticipated Doppler shifts. As can be appreciated, an important advantage of the combining the measurements is the ability to not only make more accurate measurements, but to anticipate adjustments rather than simply react. Reacting produces a delayed response and is less accurate.

Figure 3:
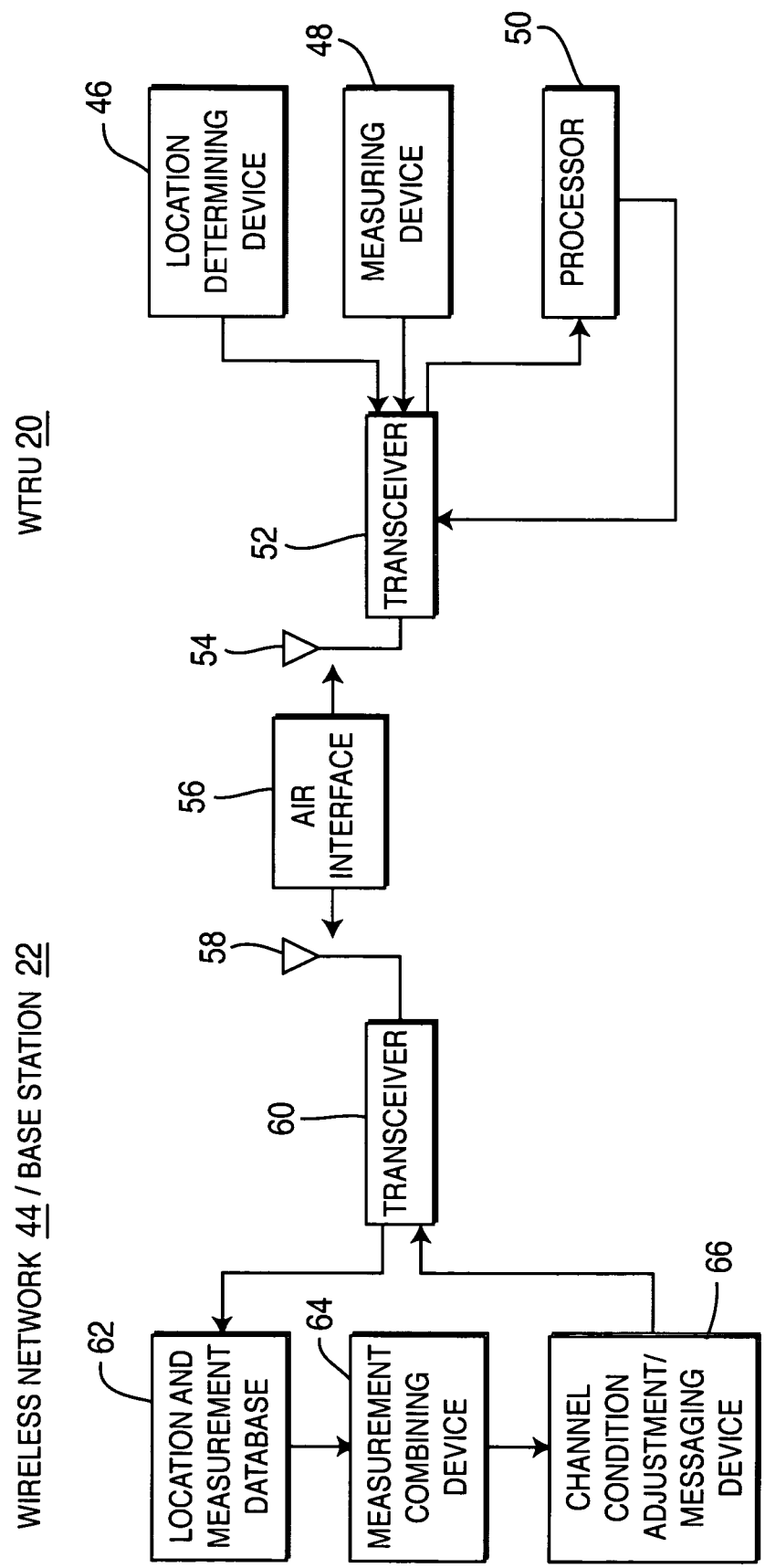
FIG. 3 is a simplified diagram of a location aided wireless measurement system.

FIG. 3 is a simplified diagram of a location aided measurement system. A WTRU 20 takes measurements at a certain location. A location determining device 46 determines a location of the WTRU 20. The location determining device 46 uses a cellular based positioning system, a global positioning satellite based system or another positioning determining system. Although the location determining device 46 is shown at the WTRU 20, it may also be employed at the base station 22/wireless network 44, based on the type of positioning system. Measurements, such as BLER, BER, SIR and Doppler, are made by a measuring device 48. Other measurements include, but are not limited to Frame Error Rate (FER), Received Signal Code Power (RSCP), Interference Signal Code Power ISCP), Received Signal Strength Indication (RSSI), Frame Timing Error, Doppler Frequency Shift, and Cyclic Redundancy Check (CRC) error. The measurement information and location information are sent to the base station 22 using a transceiver 52 and antenna 54 of the WTRU 20 through an air interface 56.

The measurement and location information is received at the base station 22 using an antenna 58 and transceiver 60. The location and measurement information is stored, such as in a database 62, along with other factors. The measurements for a location are combined by a measurement combining device 64. At the base station 22, the combined measurements are used to adjust parameters to reflect the channel conditions for subsequent WTRUs 20, such as to adjust transmission power levels and adjust the carrier frequency tracking due to an anticipated Doppler shift. Messages may also be sent to subsequent WTRUs 20 to compensate for these channel conditions. The messages are sent using the base station transceiver 60 and received using the WTRU transceiver 52. The parameters are used to make adjustments at the WTRU 20, such as by a processor 50.

The techniques described herein can further be used to set initial parameters before accurate measurements can be made, such as when a WTRU 20 is first activated in a cell or upon handover. For example, WTRU initial power and Doppler offset, and base station initial downlink (DL) power, can be more accurately set when the location of a WTRU 20 is first established as previously indicated. The Location and Measurement Database 62 in FIG. 3 is then accessed for past measurements associated with that location. The average of past measurements under like environmental conditions is then used by the WTRU 20 and base station 22 as the estimate of the measured parameter. Such measurements are typically better than estimates based on generic lookup tables and trial and error methods.

What is claimed is:

1. A method for compensating for wireless channel conditions, the method comprising:
   for a particular location, making a measurement by a plurality of wireless transmit/receive units (WTRUs);
   sending the measurements to a base station;
   combining the sent measurements to estimate a measurement made for a longer duration than any of the sent measurements wherein the combining of the sent measurements uses an ergodic process to combine the sent messages to become equivalent to a time averaged message; and
   making adjustments to compensate for channel conditions in response to the estimated measurement.

2. The method of claim 1 wherein the longer duration measurement includes a Block Error Rate (BLER).

3. The method of claim 1 wherein the longer duration measurement includes a Frame Error Rate (FER).

4. The method of claim 1 wherein the longer duration measurement includes a Bit Error Rate (BER).

5. The method of claim 1 wherein the longer duration measurement includes a Signal to Interference Ratio (SIR).

6. The method of claim 1 wherein the longer duration measurement includes a Received Signal Code Power (RSCP).

7. The method of claim 1 wherein the longer duration measurement includes an Interference Signal Code Power (ISCP).

8. The method of claim 1 wherein the longer duration measurement includes a Received Signal Strength Indication (RSSI).

9. The method of claim 1 wherein the longer duration measurement includes a Frame Timing Error.

10. The method of claim 1 wherein the longer duration measurement includes a Doppler Frequency Shift.

11. The method of claim 1 wherein the longer duration measurement includes a Cyclic Redundancy Check (CRC) error.

12. The method of claim 1 comprising categorizing the sent measurements based on weather conditions; wherein the sent measurements of a particular category are combined in the combining of the sent measurements.

13. The method of claim 1 comprising categorizing the sent measurements based on a time of day; wherein the sent measurements of a particular category are combined in the combining of the sent measurements.

14. The method of claim 1 comprising categorizing the sent measurements based on a day of week; wherein the sent measurements of a particular category are combined in the combining of the sent measurements.

15. The method of claim 1 comprising categorizing the sent measurements based on a season of year; wherein the sent measurements of a particular category are combined in the combining of the sent measurements.

16. The method of claim 1 comprising categorizing the sent measurements based on lighting conditions; wherein the sent measurements of a particular category are combined in the combining of the sent measurements.

17. The method of claim 1 comprising categorizing the sent measurements based on environmental conditions; wherein the sent measurements of a particular category are combined in the combining of the sent measurements.

18. The method of claim 1 comprising categorizing the sent measurements based on interference conditions; wherein the sent measurements of a particular category are combined in the combining of the sent measurements.

19. The method of claim 1 comprising categorizing the sent measurements based on cell loading; wherein the sent measurements of a particular category are combined in the combining of the sent measurements.

20. The method of claim 1 comprising categorizing the sent measurements based on a speed of the WTRU; wherein the sent measurements of a particular category are combined in the combining of the sent measurements.

21. The method of claim 1 comprising categorizing the sent measurements based on a type of WTRU taking the sent measurements; wherein the sent measurements of a particular category are combined in the combining of the sent measurements.

22. A method for making wireless measurements, the method comprising:

determining a location of a wireless transmit/receive unit (WTRU);

making a measurement by the WTRU;

sending the measurement to a base station; and combining the sent measurement with measurements sent by other WTRUs to estimate a measurement made for a longer duration than the sent measurement, and wherein the combining the sent measurement with measurements sent by other WTRUs uses an ergodic process to combine the sent measurements to become equivalent to a time averaged message.

\* \* \* \* \*